United States Patent Office

3,679,647
Patented July 25, 1972

3,679,647
PREPARATION OF POLYVINYL ALCOHOL HAVING IMPROVED COLOR PROPERTIES BY TREATING THE POLYVINYL ESTER WITH MAGNESIUM METAL
John E. Bristol, Niagara Falls, N.Y., assignor to E. I. du Pont de Nemours and Company, Wilmington, Del.
No Drawing. Filed Aug. 5, 1970, Ser. No. 61,483
Int. Cl. C08f 27/16
U.S. Cl. 260—91.3 PV          10 Claims

ABSTRACT OF THE DISCLOSURE

Polyvinyl alcohol having improved color properties is prepared in a process in which an alcoholic solution of the polyvinyl ester utilized to prepare the polyvinyl alcohol is treated with magnesium metal, in the presence of an acid such as acetic acid or sulfuric acid, prior to the alcoholysis of the polyvinyl ester to the corresponding polyvinyl alcohol.

BACKGROUND OF THE INVENTION

Field of invention

This invention relates to a process for the preparation of polyvinyl alcohol having improved color properties.

Prior art

Polyvinyl alcohol is prepared by forming an alcoholic solution of a polyvinyl ester, such as polyvinyl acetate, polyvinyl propionate or polyvinyl butyrate, and subjecting this solution to alcoholysis at temperatures of about 50° C. and higher, with the aid of an alkali metal alcoholate catalyst. This process is described in detail in U.S. Pat. 2,734,048. The process described in Pat. 2,734,048 is rapid; however, the polyvinyl alcohol produced may have poor color qualities. That is, polyvinyl alcohol powder produced by the process of Pat. 2,734,048 may have a yellow to tan color rather than the desired white color, and polyvinyl alcohol in the form of thin films cast from aqueous polyvinyl alcohol solutions may have a yellow to tan color rather than being a clear, colorless product.

The presence of color in polyvinyl alcohol powder or films is undesirable. For example, polyvinyl alcohol is used as a binder in paper-making processes and as a sizing agent in knitting and weaving of various textile products. Polyvinyl alcohol is a particularly desirable textile size as a substitute for starch, since waste fluids from the sizing operation containing starch are pollutants, whereas waste fluids containing polyvinyl alcohol are not pollutants. In paper-making, textile and similar applications, color-free materials are obviously desirable. Polyvinyl alcohol is also converted into products widely used in film form as a structural component in glass laminates acting to prevent the shattering of glass on impact; in such use, color-free polyvinyl alcohol is essential. Therefore, it is desirable to produce polyvinyl alcohol which will be substantially colorless in solution and when made into films for the various applications discussed above.

The prior art teaches that the color formation in polyvinyl alcohol may be due to reactions of small or trace amounts of impurities which are potential color formers, such as aldehydes or other potential chromophoric atomic groupings, which are present in the polyvinyl alcohol as the result of the alcoholysis of the polyvinyl ester with the aid of alkali metal alcoholate catalysts. It is also thought that unsaturated groups found in the alcoholic solutions of the polyvinyl esters subjected to alkaline alcoholysis may be color precursors and that color formation is intensified during alcoholysis by reaction through the unsaturated bonds.

Since the problem of color formation in polyvinyl alcohol is well known in the art, many attempts have been made to prepare polyvinyl alcohol which is color free and which will remain color free when utilized in many applications. The various suggestions which have been made to improve the color properties of polyvinyl alcohol generally fall into one of the following categories: pretreating the polyvinyl ester prior to alcoholysis; treatment of the polyvinyl alcohol after alcoholysis; or treatment of the polyvinyl ester as it undergoes alcoholysis.

U.S. Pat. No. 2,850,489, for example, teaches that pretreating an alcoholic solution of a polyvinyl ester with a strong acid, such as sulfuric acid, prior to the alcoholysis of the ester will yield a polyvinyl alcohol having much less color and improved thermal stability than is the case without acid pretreatment. This patent also teaches that various color-suppressing agents may be added to the polyvinyl ester during the alcoholysis reaction. U.S. Pat. 2,785,146 teaches that the thermal stability of polyvinyl alcohol may be improved by adding an acid reacting salt (i.e., zinc sulfate) to the polyvinyl alcohol. In addition, post alcoholysis additions of aldehyde-complexing agents, such as sodium bisulfite, hydroxylamine or hydrazine, and post alcoholysis additions of chlorine, bromine or hypochlorites and hypobromites have been used to obtain polyvinyl alcohol with reduced color. These additions have accomplished substantially complete color removal; however, color redevelops if the pH of the polyvinyl alcohol is increased to 7 or higher.

It is the principal object of this invention to provide a process for producing polyvinyl alcohol having improved color properties, that is, substantially color free polyvinyl alcohol. A further object of this invention is to provide substantially color free polyvinyl alcohol solutions which remain color free at pH values of 7 or higher. Likewise, it is an object of this invention to provide substantially color free polyvinyl alcohol which can be converted into compounds such as substantially color free polyvinyl butyrals. These and other objects will be apparent as the invention is described.

SUMMARY OF THE INVENTION

The method of the present invention comprises, in the preparation of polyvinyl alcohol by the alkali metal alcoholate-catalyzed alcoholysis of an alcoholic solution of a polyvinyl ester, the improvement comprising pretreating the alcoholic solution of the polyvinyl ester with from about 0.03% to about 2%, by weight, based on the weight of the polyvinyl ester, of magnesium metal, and an acid having an ionization constant equivalent to or higher than acetic acid in an amount at least substantially stoichiometrically equivalent to the magnesium, continuing the pretreating of the polyvinyl ester until the liberation of nascent hydrogen ceases, and then alcoholyzing the pretreated polyvinyl ester.

DETAILED DESCRIPTION OF THE INVENTION

The magnesium metal used in pretreating the polyvinyl ester is added to the alcoholic solution of the polyvinyl ester in an amount ranging from about 0.03% to about 2%, by weight based on the weight of the polyvinyl ester in solution. In a preferred embodiment of this invention, from about 0.1% to about 1%, by weight, of magnesium metal is added to the polyvinyl ester solution. The magnesium metal may be added to the polyvinyl ester solution in any form; however, it is preferred to add the magnesium in the form of small pieces of magnesium wire or in the form of finely-divided magnesium, especially—100 mesh, such as magnesium powder.

The magnesium metal is combined with the alcoholic solution of the polyvinyl ester in the presence of an acid having an ionization constant equivalent to or higher than acetic acid. The preferred acids are acetic acid and sulfuric acid, acetic acid being especially preferred. The acid selected is added in a quantity at least substantially sufficient to cause the solution of the magnesium metal in the alcoholic polyvinyl ester solution. Thus, the amount of acid required is at least substantially the stoichiometric quantity, preferably substantially the stoichiometric quantity, required to combine with the amount of magnesium metal added to the polyvinyl ester. The acid selected may be added to the polyvinyl ester solution prior to the addition of the magnesium metal, as is preferred in the case of sulfuric acid, or the magnesium metal and the acid may be added simultaneously to the polyvinyl ester solution, as is preferred when acetic acid is used. Of course, the acid may also be added after the magnesium metal is added to the polyvinyl ester solution so long as sufficient time is provided for the substantially complete reaction of the magnesium metal with the acid.

The magnesium metal is combined with the polyvinyl ester at a temperature ranging from about 20° C. to about 150° C., preferably from about 45° C. to about 100° C., for a period of time sufficient to cause solution of the magnesium metal in the polyvinyl ester solution, usually from about one to about two hours at 60° C. being sufficient. As would be expected, magnesium metal powder goes into solution in the polyvinyl ester solution more rapidly than magnesium wire due to the greater surface area of the magnesium powder. As the magnesium metal goes into solution, it reacts with the acid present liberating nascent hydrogen. This provides a convenient determinant for measuring the end point of the magnesium treatment, that being, cessation of the liberation of nascent hydrogen. While the pressure conditions employed may be sub-atmospheric or superatmospheric, especially at the higher temperatures, atmospheric pressure conditions are preferred.

It is theorized that, during the magnesium treatment of the polyvinyl ester, the nascent hydrogen hydrogenates the unsaturated bonds in the polyvinyl ester thereby preventing reaction through the unsaturated bonds with resultant color formation during the subsequent alkaline-alcoholysis reaction.

The polyvinyl ester utilized in this invention may be derived from a carboxylic acid containing from one to four carbon atoms such as formic, acetic, propionic, or butyric acid. The polyvinyl ester, e.g. polyvinyl acetate, is treated in the form of an alcoholic solution in which the polyvinyl ester is present in a concentration of from about 20% to about 60%, preferably from about 30% to about 50%, by weight, based on the combined weight of the polyvinyl ester and alcohol solvent. Suitable alcohols for the solution of the polyvinyl ester include the monohydroxy saturated aliphatic alcohols containing from one to four carbon atoms, such as methanol, ethanol, propanol and butanol, preferably methanol. After the alcoholic solution of the polyvinyl ester has been pretreated with the magnesium metal, the alcoholysis reaction may proceed. In general, the process followed is that described in U.S. Pat. 2,734,048.

Alcoholysis is accomplished with a hydrolytic alcohol selected from the group consisting of methanol, ethanol, the mono-methyl ether of ethylene glycol and the mono-ethyl ether of ethylene glycol. Methanol is the preferred hydrolytic alcohol. Preferably from about 1 to about 3 parts, by weight, of alcohol are employed for each part, by weight, of polyvinyl ester reacted.

The alcoholysis is aided by the presence of an anhydrous alkali metal alcoholate catalyst derived from an alkanol containing from 1 to about 10 carbon atoms. The preferred catalyst is sodium methylate. The catalyst is preferably added in the form of a solution in anhydrous alcohol, preferably made by reacting an alkali metal, such as sodium, with an excess of an anhydrous alcohol, e.g. methanol. Any alkali metal alcoholate may be used as a catalyst, e.g. potassium ethylate, lithium butylate, sodium propylate, sodium butylate, sodium decylate, and the like. The catalyst is utilized in a concentration of from about 0.1% to about 5%, by weight, based on the weight of the reaction mixture. Preferably, from about 0.2% to about 0.5%, by weight, of sodium methylate is a satisfactory catalyst.

The alcoholysis reaction may be carried out at a temperature varying from about 20° C. to about 150° C., preferably from about 40° C. to about 100° C. While the pressure conditions used may be sub-atmospheric or superatmospheric, especially at higher temperatures, atmospheric pressure conditions are perferred.

The alcoholysis reaction is preferably carried out in an apparatus consisting of multiple reaction vessels connected in series such that the effluent from the first reaction vessel flows into the second reaction vessel and the effluent from the latter is treated to recover the polyvinyl alcohol therefrom. Such an apparatus is defined with more specificity in U.S. Pat. 2,734,048.

The polyvinyl alcohol produced by this process has improved color properties, that is, it is substantially color free and does not develop color when subjected to either alkaline or acid treatments. By substantially color free polyvinyl alcohol is meant polyvinyl alcohol having a color value, expressed as "percent yellow," no higher than about 5%, as determined with a Coleman Junior Spectrophotometer on a 4% solution of the polyvinyl alcohol in distilled water according to the method described hereinafter in Example 1.

In addition, the treatment with magnesium metal has no adverse effects on the other desirable qualities of polyvinyl alcohol; that is, the stability, for example, of the polyvinyl alcohol is not affected by the treatment of the polyvinyl ester with magnesium metal. The film forming properties, rate of solution, and the temperature required for solution of the polyvinyl alcohol in water are also in no way adversely affected by the treatment with the magnesium metal. The polyvinyl alcohol produced by this process can be converted to polyvinyl butyrals by the process described in U.S. Pats. 2,353,355 or 3,153,009, the polyvinyl butyrals being exceptionally desirable as a structural component to prevent shattering of laminated glass because of its freedom from yellow color.

This invention may be more fully explained from a consideration of the following examples which are not to be considered as limiting the scope of this invention.

Example 1

Five and a half grams of magnesium metal wire cut into small pieces is added with agitation to 2900 cc. of a solution of 1100 grams of polyvinyl acetate in methanol containing 29 grams of acetic acid at a temperature of 55° C. and the agitation is continued until all of the magnesium metal dissolves in the polyvinyl acetate solution, about two hours being sufficient.

Six hundred and fifty ml. of methanol and 40 grams of sodium methylate are added with agitation to a glass reactor fitted with a stainless steel paddle agitator and reflux condenser contained in a water bath heated to 55° C. When the sodium methylate is completely dissolved in the methanol, the magnesium treated polyvinyl acetate solution is continuously added, with agitation, over an interval of 390 minutes. On completion of the polyvinyl acetate addition, an additional time interval of 30 minutes is taken after which the reaction mixture is neutralized with acetic acid and then filtered through filter paper on a Büchner funnel and washed with a volume of methanol equivalent to the volume of the initial filtrate. The Büchner funnel with filter cake is covered with filter paper, placed in an oven at 40–50° C. and dried with a vacuum from a water aspirator for approximately 12 hours. The polyvinyl alcohol produced is relatively color free and is color stable at both alkaline and acid pH. The color of the polyvinyl alcohol is determined on the basis of the precent yellow, which can be measured with a standard laboratory instrument such as a Coleman Junior Spectrophotometer. For example, an aliquot of the dry product is dissolved at 90–95° C. to form a 4% solution in distilled water. The color of the 4% solution at 25° C. is found to be 3.8% yellow.

The precent yellow is determined with a Coleman Junior Spectrophotometer by measuring the transmission (T) of light through the solution at wave lengths of 450, 560 and 640 A. and calculated by the equation:

$$\frac{(T_{640}-T_{450}) \times 100}{T_{560}} = \text{Percent yellow}$$

As a reference, distilled water measured under the same conditions gives a value of 0% yellow.

washed with methanol and vacuum dried at 60–65° C. for 12 hours.

In Table I, the column headed "Pretreatment" indicates the type of pretreatment the polyvinyl ester undergoes before the alcoholysis takes place. The alcoholysis reaction goes to about 95% completion in "Container 1" and to about 99% completion in "Container 2." The "Finisher" allows alcoholysis to be essentially complete at 99.9%, meaning that there is less than 0.1% unreacted ester in the polyvinyl alcohol.

Table II illustrates the percent yellow of 4% and 10% solutions in distilled water of the various polyvinyl alcohols shown in Table I. The percent yellow is measured on a Coleman Junior Spectrophotometer according to the procedure described in Example 1.

TABLE I.—POLYVINYL ALCOHOL DERIVED FROM POLYVINYL ACETATE (ALCOHOLYSIS DATA)

| | | | Container 1 | | | | Container 2 | | |
|---|---|---|---|---|---|---|---|---|---|
| Test number | Pretreatment [1] | 40% polyvinyl acetate in methanol, gm./min. | 10% NaOMe in methanol, gm./min. | NR [2] (min.) | Temp., °C. | Concentration (percent) NaOMe in reactor | Temp., °C. | Concentration (percent) NaOMe in reactor | NR [2] (min.) | Finisher temp., °C. |
| 1 | None | 10 | 6 | 120 | 55 | 0.4 | 55 | 0.3 | 90 | 55–25 |
| 2 | do | 8 | 5 | 150 | 45 | 0.4 | 55 | 0.3 | 112 | 55–25 |
| 3 | do | 6 | 4 | 200 | 25 | 0.6 | 55 | 0.4 | 150 | 55–25 |
| 4 | H$_2$SO$_4$ (a) | 10 | 6 | 120 | 55 | 0.4 | 55 | 0.3 | 90 | 55–25 |
| 5 | H$_2$SO$_4$ (a) | 8 | 5 | 150 | 45 | 0.4 | 55 | 0.3 | 112 | 55–25 |
| 6 | H$_2$SO$_4$ plus Mg (b) | 10 | 6 | 120 | 55 | 0.4 | 55 | 0.3 | 90 | 55–25 |
| 7 | H$_2$SO$_4$ plus Mg (b) | 9 | 5 | 150 | 45 | 0.4 | 55 | 0.3 | 112 | 55–25 |
| 8 | Mg plus acetic acid (c) | 10 | 6 | 120 | 55 | 0.4 | 55 | 0.3 | 90 | 55–25 |
| 9 | Mg plus acetic acid (d) | 10 | 6 | 120 | 55 | 0.4 | 55 | 0.3 | 90 | 55–25 |

[1] Pretreatment.—(a)=Solution of polyvinyl acetate in methanol is heated to 60° C. 0.075%, by weight, of concentrated H$_2$SO$_4$, based on polyvinyl acetate, is added with agitation; the mixture is held at 60° C. for 15 minutes and then neutralized with slight excess of sodium acetate; (b)=Solution of polyvinyl acetate is treated as in (a) but instead of adding sodium acetate, magnesium metal powder (200 mesh or finer) is added to the polymer and the mixture held until all of the magnesium is reacted and dissolved, usually 60 to 90 minutes. 0.1%, by weight, magnesium, based on polyvinyl acetate, is used; (c)=Solution of polyvinyl acetate is heated to 60° C. and maintained at that temperature and 0.1%, by weight, magnesium metal powder and 0.3%, by weight, glacial acetic acid, based on the weight of polyvinyl acetate, is added and the mixture is stirred at 60° C. until the magnesium is reacted and dissolved; (d)=Same as (c) but using 1%, by weight, magnesium and 3%, by weight, acetic acid.

[2] NR=Nominal residence time in one vessel of the reactor which is equivalent to the time interval for one complete displacement of the reaction charge.

Example 2

A sample of the same polyvinyl acetate solution used in Example 1 is alcoholyzed by the procedure used in Example 1 without treatment with magnesium metal or the addition of acetic acid. An aliquot of this dried product dissolved in distilled water as a 4% solution has a color of 16% yellow as determined by the Coleman Junior Spectrophotometer according to the above procedure.

Example 3

To illustrate the effect of treating the polyvinyl ester with magnesium metal, medium viscosity polyvinyl acetate (molar viscosity in benzene at 20° C. is 30 cp.), is subjected to variable conditions of alcoholysis according to the following procedure with the results indicated in Tables I and II.

The apparatus consisted of two reaction vessels connected in series so that the effluent from one overflowed into the next. The apparatus is more fully decsribed in U.S. Pat. 2,734,048. The polyvinyl acetate in solution in methanol and the hydrolytic alcohol (methanol) and sodium methylate solution (catalyst) are fed continuously into the first (Container 1) of two vessels connected in series. As the alcoholysis proceeds, a slurry of the polyvinyl alcohol, which is insoluble in the alcoholic solution, is formed. The slurry of polyvinyl alcohol in a mixture of alcohol and catalyst then enters the top of the next succeeding reaction vessel (Container 2). No additional reactants are added in the second vessel; however, the alcoholysis proceeds substantially to completion. The product effluent from the second vessel, substantially free of unreacted polyvinyl ester, is collected in a 500 ml. container (Finisher), held at ambient temperature for 30 minutes, then neutralized with acetic acid. Neutralized slurries for each run of alcoholysis conditions were mixed, filtered,

TABLE II.—COLOR OF POLYVINYL ALCOHOL FROM POLYVINYL ACETATE (ANALYSIS)

| Test number | 10% solution pH 6, percent yellow [1] | 4% solution pH 6, percent yellow [1] |
|---|---|---|
| 1 | 26 | 8.5 |
| 2 | 24 | 8.0 |
| 3 | 18 | 6.0 |
| 4 | 14 | 5.7 |
| 5 | 14 | 5.5 |
| 6 | 12 | 4.0 |
| 7 | 10 | 3.5 |
| 8 | 14 | 4.0 |
| 9 | 5 | 2.8 |

[1] Coleman Junior Spectrophotometer determination.

The results of the color measurements shown in Table II illustrate that pretreatment of the polyvinyl ester with magnesium metal and an acid (Tests 6–9) produces polyvinyl alcohol with less yellow than that produced with no pretreatment (Tests 1–3) or with acid treatment alone (Tests 4–5).

What is claimed is:

1. In the preparation of polyvinyl alcohol by the alkali metal alcoholate-catalyzed alkaline alcoholysis of an alcoholic solution of a polyvinyl ester derived from a carboxylic acid containing from 1 to 4 carbon atoms, the improvement comprising pretreating the alcoholic solution of the polyvinyl ester with from about 0.03% to about 2%, of magnesium metal, based on the weight of polyvinyl ester, and an acid having an ionization constant equivalent to or higher than acetic acid, in an amount at least substantially stoichiometrically equivalent to the magnesium, continuing the pretreating of the polyvinyl ester until the liberation of nascent hydrogen ceases, and then alcoholyzing the pretreated polyvinyl ester.

2. The method of claim 1 wherein the pretreatment is with from about 0.1% to about 1.0%, by weight, of magnesium metal.

3. The method of claim 1 wherein the amount of acid added with the magnesium metal is substantially stoichiometrically equivalent to the amount of magnesium metal added to the polyvinyl ester.

4. The method of claim 1 wherein the pretreatment is at a temperature ranging from about 20° C. to about 150° C.

5. The method of claim 4 wherein the pretreatment is at a temperature of from about 45° C. to about 100° C.

6. The method of claim 5 wherein the pretreatment is at a temperature of about 60° C. over a period of time of from about one to about two hours.

7. The method of claim 1 wherein the acid is selected from the group consisting of acetic acid and sulfuric acid.

8. The method of claim 7 wherein the acid is sulfuric acid and wherein the sulfuric acid is added to the polyvinyl ester prior to the addition of the magnesium metal.

9. The method of claim 7 wherein the acid is acetic acid.

10. Polyvinyl alcohol prepared according to claim 1.

References Cited

UNITED STATES PATENTS

| | | | |
|---|---|---|---|
| 2,353,355 | 9/1944 | Stamatoff | 260—32 |
| 2,734,048 | 2/1956 | Bristol et al. | 260—91.3 |
| 2,785,146 | 3/1957 | Davies et al. | 260—45.75 |
| 2,850,489 | 9/1958 | Turnbull | 260—91.3 |
| 2,862,916 | 12/1958 | Lukman et al. | 260—91.3 |
| 3,033,843 | 5/1962 | Inskip et al. | 260—91.3 |
| 3,086,963 | 4/1963 | Fujii et al. | 260—91.3 |
| 3,153,009 | 10/1964 | Rombach | 260—73 |

FOREIGN PATENTS

| | | | |
|---|---|---|---|
| 808,108 | 1/1959 | Great Britain | 260—91.3 |

JOSEPH L. SCHOFER, Primary Examiner

S. M. LEVIN, Assistant Examiner

U.S. Cl. X.R.

260—89.1, 91.3 VA; 161—199